G. I. LEONARD & W. C. CUTLER.
REFRIGERATING APPARATUS.
APPLICATION FILED NOV. 24, 1915.
Reissued Apr. 18, 1916. 14,112.
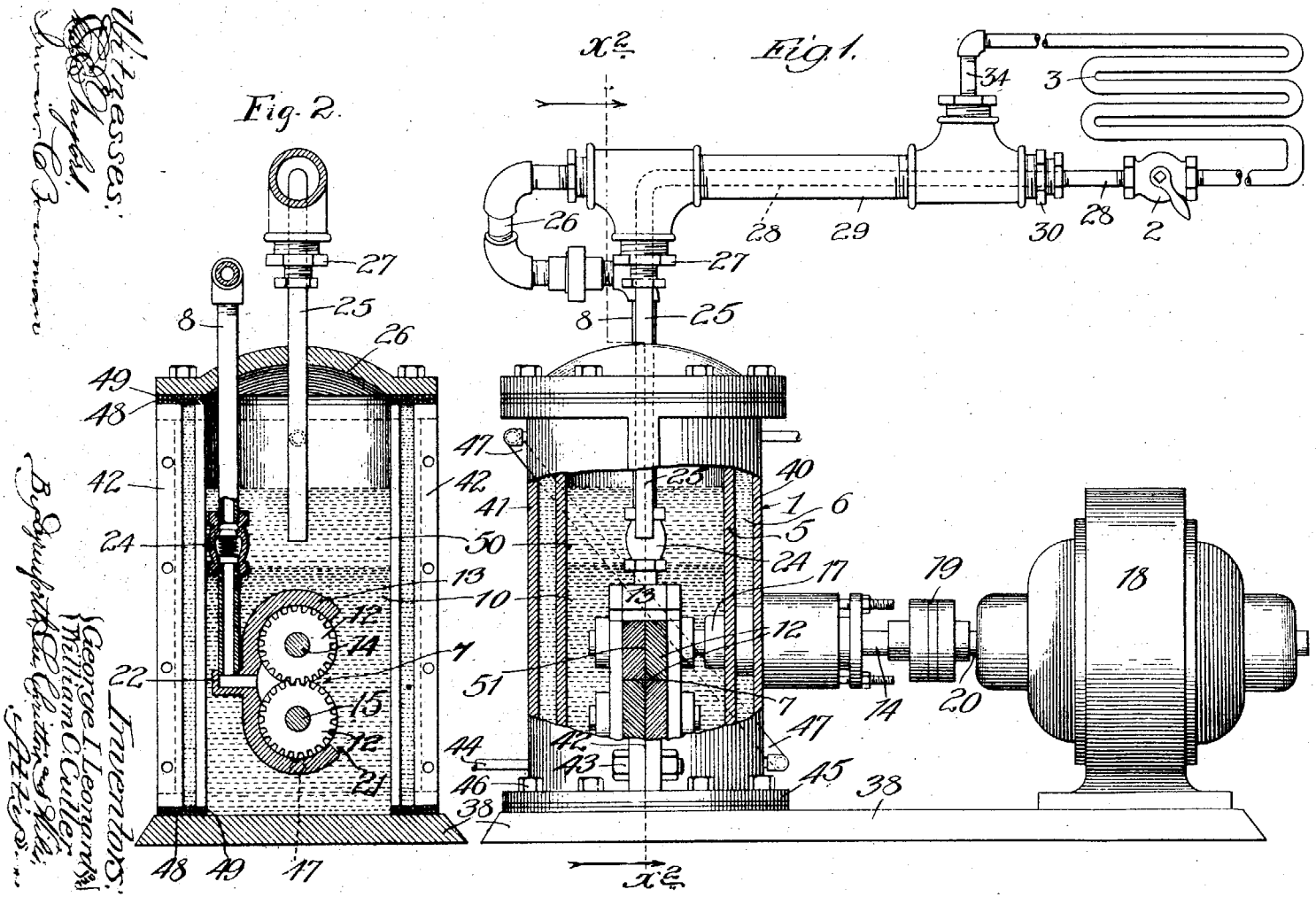
Witnesses:
Chas. E. Taylor,
Irvin C. Bowman
Inventors:
George I. Leonard,
William C. Cutler,
By Dyrenforth, Lee, Christie & Wills,
Attys.

UNITED STATES PATENT OFFICE.

GEORGE I. LEONARD, OF CHICAGO, ILLINOIS, AND WILLIAM C. CUTLER, OF LOS ANGELES, CALIFORNIA, ASSIGNORS TO LEONARD ROTARY PUMP CORPORATION, A CORPORATION OF CALIFORNIA.

REFRIGERATING APPARATUS.

14,112. Specification of Reissued Letters Patent. Reissued Apr. 18, 1916.

Original application filed December 28, 1911, Serial No. 668,328. Renewed April 28, 1913, Serial No. 764,259. Original No. 1,086,675, dated February 10, 1914. Application for reissue filed November 24, 1915. Serial No. 63,315.

*To all whom it may concern.*

Be it known that we, GEORGE I. LEONARD, and WILLIAM C. CUTLER, citizens of the United States, residing, respectively, at Chicago, in the county of Cook and State of Illinois, and Los Angeles, in the county of Los Angeles and State of California, have invented a new and useful Refrigerating Apparatus, of which the following is a specification.

This invention relates to improvements in apparatus for refrigeration by the use of a readily condensable fluid or vapor.

The invention is particularly intended for use in refrigerating plants or apparatus of small capacity such as are adapted for use in hotels, houses or commercial establishments.

The main object of the invention is to provide a refrigerating apparatus of this character which will be extremely simple in construction and operation, and at the same time highly efficient.

Other objects of the invention will appear hereinafter.

The accompanying drawings illustrate an embodiment of the invention, and referring thereto—

Figure 1 is a side elevation of the apparatus partly in section, the refrigerating pipe line being shown diagrammatically. Fig. 2 is a section on line $x^2$—$x^2$, Fig. 1.

The refrigerating apparatus comprises a combined compressor and condenser indicated at 1, an expansion valve indicated at 2, and a refrigerating pipe line or member indicated at 3, said parts being connected by a piping in such manner as to carry out the cycle of operation consisting of compression, cooling, condensation and expansion.

The compressing and condensing apparatus 1 comprises a case or tank 5, which may be of any suitable shape, means such as a water jacket 6 surrounding said case for abstracting heat from the contents of the case. A rotary pump 7 is inclosed within the case, a pipe 8 for the expanded gas or vapor being connected to the intake side of the said pump, and the outlet side of said pump communicating directly with the interior space of the case 5, and a body of liquid indicated at 10 occupying the lower portion of the interior of the case 5 and submerging the pump therein and the outlet thereof.

The rotary pump 7 consists of two gears 12 mounted to rotate in a casing 13, each gear being preferably a double spiral gear, and said gears being mounted respectively on shafts 14 and 15 journaled in said casing 13, the shaft 14 extending through a stuffing box 17 in the walls of the case 5 and water jacket 6, and being connected at its outer end to suitable driving means such as a motor 18, a flexible joint 19 being interposed if necessary between the motor shaft 20 and the shaft 14 of the pump. The outlet side of the pump case 13 is cut away or open, as shown at 21, and the inlet side of the pump case is provided with a passage 22 communicating with the pipe 8 aforesaid, said pipe being provided with a check valve 24 to prevent back flow of gases from the pump.

The upper part of the case 5 constitutes a receiver for the compressed and condensed vapor or fluid, and an outlet pipe 25 for the condensed liquid extending through the top 26 of the case 5 and through a stuffing box 27 to connect with a pipe 28 extending within an outer pipe 29, said pipe 28 extending at its farther end through a stuffing box 30 at the corresponding end of said pipe 29, and being connected through an expansion valve 2 to the pipe or coil 3 for distributing or leading the expanded cold fluid to any suitable refrigerator or other device to be cooled. A return pipe 34 from said pipe or coil 3 connects to the outer end of the end portion of the pipe 29 aforesaid, the other end of said pipe being connected by connections 36 to the pipe 8 aforesaid.

The case 5 may be of any suitable construction, consisting, for example, of a base 38 and castings 40 and 41 forming two halves of a cylindrical case, each of said castings being formed with a semi-cylindrical water-jacket chamber 6, and said castings having vertical flanges 42 to enable them to be fastened by bolts 43, and being provided with horizontally extending flanges 45 to receive bolts 46 for fastening the case members to the base and to the top member 26. A pipe 47 connects chambers 6. Gaskets are interposed between the cylindrical portion of the case and the top and bottom thereof, each gasket consisting, for example, of a brass ring 48 and a ring 49 of asbestos filled with a mixture of glycerin and litharge. We have found that such a gasket is impervious to the water in the water jacket, to the glycerin, and to the rhigolene.

The operation is as follows:—The liquid indicated at 10 within the case 5 and submerging the pump is of such a nature that it does not mix or react with the refrigerating medium. I have found that rhigolene is a suitable refrigerating medium for use in this apparatus, and I prefer to use glycerin as the liquid for submerging the pump, glycerin being without effect on the rhigolene and not mixing therewith. Glycerin is heavier than rhigolene and is non-volatile at temperatures usually present in the apparatus, both of these being necessary properties for the submerging liquid. Moreover, glycerin has the advantageous property that it does not nebulize when stirred or agitated with the rhigolene vapor. That is to say, the rhigolene does not form bubbles in the glycerin under such conditions. Water is supplied to the water jacket chamber 6 through the connection 44, and the temperature in the case 5 is thereby maintained at such a point in the operation of the pump that the compression produced on the rhigolene vapor is sufficient to cause condensation of the rhigolene to liquid, forming a body of liquid rhigolene indicated at 50 resting on the body of glycerin 10. As the liquid is compressed by the operation of pump 7 in continual contact with the glycerin and the metallic parts of the pump, the cooling effect of the water jacket is continually transmitted from the outer walls of the case through the glycerin to the metallic parts of the pump and to the rhigolene vapor which is being compressed, so that the maximum cooling effect on the rhigolene is obtained, and at the same time the glycerin acts as a seal, preventing leakage of vapor in the pump and insuring the full compressive action of the pump on the vapor. The rhigolene condensed in this manner within the case is, by reason of the pressure in the case, forced out through the pipe 25 and passes to the expansion valve 2, at which it is expanded, the resulting cold vapor or gas passing through the pipe or coil 3 and back through the outer pipe 29, exerting a cooling effect on the liquid within the inner pipe 28 so as to increase the refrigerating effect. The gas or vapor passes from the pipe 29 to the pipe 8 aforesaid, leading to the intake of the pump where it is again subjected to compression by the pump and forced into the space within the case 1, the compressed fluid rising through the body of glycerin 10 into the space over said body of fluid.

An important advantage of the construction above described is that the compressing and condensing apparatus is wholly self-contained and requires no external case or retainer for the refrigerating liquid.

The form of rotary pump shown operates by carrying the vapor or gas in the spaces between the teeth and delivering such vapor or gas to the outlet of the pump casing into the body of the liquid 10 in the interior of the case 1, said body of liquid being cooled by the action of the water jacket so that as the gas or vapor is brought into contact therewith and is subjected to the full pressure in the interior of the case it is condensed wholly or partially and rises to the top of the body of liquid 10 by reason of its lighter specific gravity. The spaces between the teeth are filled with the glycerin or the submerging liquid in this operation, and in the continuation of the rotary movement this liquid is squeezed out from in between the teeth by the intermeshing of the gears. In this intermeshing operation the formation of the gears with two spiral portions having reversely inclined teeth is of special advantage in that it gives a gradual intermeshing action so that the liquid is first forced from the end portions of the spaces and expulsion of the liquid proceeds gradually from the end portions toward the center. By this gradual action of the liquid, due to the spiral form of the gear teeth, we avoid excessive strain or pounding due to sudden pocketing and compression of the liquid between the teeth at the point of intermeshing, thereby avoiding excessive strain on the bearings with resulting wear and friction.

To eliminate any sudden compression that might occur at the moment that the compression or expulsion of liquid reaches the mid-point of the teeth where the two spiral portions come together, we may provide at such portion a recess or pocket 51 forming a passage or clearance space for expulsion of liquid at this moment.

What we claim is:

1. A refrigerating apparatus comprising a case provided with cooling means, a rotary pump within said case having an outlet opening into the space within said case, a body of fluid within said case submerging said pump and serving as a seal for the pump and as a heat communicating means, a supply pipe extending into said case and communicating with the pump at the inlet thereof for supplying to the pump a relatively volatile fluid refrigerating medium, an outlet pipe extending from said case from beyond the level of the body of sealing liquid therein to serve as an outlet for the condensed refrigerating fluid, and expansion and distributing means connected to the said outlet and inlet pipes.

2. In a refrigerating apparatus, a compressing and condensing device comprising a case provided with cooling means, a rotary pump within said case having an outlet opening into the space within said case, a body of fluid within said case submerging said pump and serving as a seal for the pump and as a heat communicating means, a supply pipe extending into said case and communicating with the pump at the inlet thereof for supplying to the pump a relatively volatile fluid refrigerating medium, and an outlet pipe extending from said case from beyond the level of the body of sealing liquid therein to serve as an outlet for the condensed refrigerating fluid.

In testimony whereof, we have hereunto set our hands at Chicago, Illinois and Los Angeles, California respectively on the 19th day of October 1915 and the 9th day of November, 1915.

GEORGE I. LEONARD.
WILLIAM C. CUTLER.

Witnesses to the signature of George I. Leonard.

HERBERT A. GASKYN,
FRANK J. IRVING.

Witnesses to the signature of William C. Cutler.

E. GRIGSBY,
SULLY TUSSO.